United States Patent
Kulkarni et al.

(10) Patent No.: US 10,598,104 B2
(45) Date of Patent: Mar. 24, 2020

(54) MASS AIRFLOW SENSOR MONITORING USING SUPERCHARGER AIRFLOW CHARACTERISTICS IN AN OPPOSED-PISTON ENGINE

(71) Applicant: ACHATES POWER, INC., San Diego, CA (US)

(72) Inventors: Vadiraj Kulkarni, San Diego, CA (US); Daniel M. Schum, Vista, CA (US)

(73) Assignee: ACHATES POWER, INC., San Diego, CA (US)

( * ) Notice: Subject to any disclaimer, the term of this patent is extended or adjusted under 35 U.S.C. 154(b) by 303 days.

(21) Appl. No.: 15/423,908

(22) Filed: Feb. 3, 2017

(65) Prior Publication Data

US 2018/0223750 A1  Aug. 9, 2018

(51) Int. Cl.

| | |
|---|---|
| *F02D 41/00* | (2006.01) |
| *F02B 75/28* | (2006.01) |
| *G01F 1/86* | (2006.01) |
| *G01F 25/00* | (2006.01) |
| *F02B 33/34* | (2006.01) |
| *F02M 35/10* | (2006.01) |

(Continued)

(52) U.S. Cl.
CPC .......... *F02D 41/0007* (2013.01); *F02B 25/08* (2013.01); *F02B 33/34* (2013.01); *F02B 39/10* (2013.01); *F02B 75/282* (2013.01); *F02D 41/0097* (2013.01); *F02D 41/18* (2013.01); *F02D 41/222* (2013.01); *F02M 26/03* (2016.02); *F02M 35/10157* (2013.01); *F02M 35/10386* (2013.01); *G01F 1/86* (2013.01); *G01F 25/0053* (2013.01); *F02D 2200/0402* (2013.01); *Y02T 10/144* (2013.01); *Y02T 10/40* (2013.01)

(58) Field of Classification Search
CPC ......... F02D 41/0007; F02D 2200/0402; F02D 41/0097; F02D 41/222; F02D 41/18; G01F 1/86; G01F 25/0053; F02B 25/08; F02B 39/10; F02B 75/282; F02B 33/34; F02M 35/10386; F02M 35/10157; F02M 26/03; Y02T 10/40; Y02T 10/144
See application file for complete search history.

(56) References Cited

U.S. PATENT DOCUMENTS

| | | | |
|---|---|---|---|
| 5,546,795 A | 8/1996 | Yamagishi | 73/118.2 |
| 6,155,952 A | 12/2000 | Antonov | 475/266 |

(Continued)

FOREIGN PATENT DOCUMENTS

| | | |
|---|---|---|
| CN | 102606325 A | 7/2012 |
| DE | 10232337 A1 | 2/2004 |

(Continued)

OTHER PUBLICATIONS

International Search Report and Written Opinion for PCT application PCT/US2015/062292, dated Mar. 1, 2016.

(Continued)

*Primary Examiner* — Sizo B Vilakazi
(74) *Attorney, Agent, or Firm* — Terrance A. Meador; Julie J. Muyco

(57) ABSTRACT

In an air handling system of an opposed-piston engine, mass airflow sensor operation is monitored by comparing mass airflow measured by the sensor with mass airflow through a supercharger.

22 Claims, 5 Drawing Sheets

(51) Int. Cl.
  *F02D 41/22*   (2006.01)
  *F02M 26/03*   (2016.01)
  *F02D 41/18*   (2006.01)
  *F02B 25/08*   (2006.01)
  *F02B 39/10*   (2006.01)

(56) References Cited

U.S. PATENT DOCUMENTS

| | | |
|---|---|---|
| 6,363,713 B1 | 4/2002 | Wu et al. .................. 60/274 |
| 6,370,935 B1 | 4/2002 | He et al. |
| 6,701,282 B2 | 3/2004 | Ting et al. |
| 6,892,569 B2 | 5/2005 | Martin et al. ............. 73/119 A |
| 6,928,360 B2 | 8/2005 | Baeuerle et al. |
| 7,055,507 B2 | 6/2006 | Kelley, Jr. ................ 123/559.1 |
| 7,069,773 B2 | 7/2006 | Stempnik et al. |
| 7,076,952 B1 | 7/2006 | Vetrovec .................. 123/559.1 |
| 7,134,273 B2 | 11/2006 | Mazur et al. ............. 60/286 |
| 7,251,989 B2 | 8/2007 | Baeuerle |
| 7,302,335 B1 | 11/2007 | Xiao |
| 7,337,766 B2 | 3/2008 | Nakayama et al. ........ 123/435 |
| 7,353,699 B2 | 4/2008 | Rollinger et al. ......... 73/118.1 |
| 7,367,188 B2 | 5/2008 | Barbe et al. |
| 7,437,874 B2 | 10/2008 | Ramamurthy et al. .... 60/602 |
| 7,628,063 B2 | 12/2009 | Yezerets et al. .......... 73/114.71 |
| 7,832,200 B2 | 11/2010 | Kesse et al. .............. 60/286 |
| 8,386,204 B2 | 2/2013 | Clanflone et al. ........ 702/99 |
| 8,515,710 B2 | 8/2013 | Wang et al. .............. 702/183 |
| 8,521,354 B2 | 8/2013 | Sasaki |
| 8,596,045 B2 | 12/2013 | Tuomivaara et al. ..... 60/295 |
| 8,818,659 B2 | 8/2014 | Sujan et al. .............. 701/53 |
| 8,818,661 B2 | 8/2014 | Keilers et al. ............ 701/54 |
| 8,852,050 B2 | 10/2014 | Thomassy .................. 476/38 |
| 9,206,751 B2 | 12/2015 | Herod et al. |
| 9,284,884 B2 | 3/2016 | Nagar et al. ............. F02B 47/08 |
| 9,512,790 B2 | 12/2016 | Nagar ....................... F02B 25/08 |
| 9,982,617 B2* | 5/2018 | Nagar ....................... F02B 33/34 |
| 9,989,029 B2 | 6/2018 | Petrovic |
| 2003/0019212 A1 | 1/2003 | Baeuerle et al. .......... 60/608 |
| 2004/0019424 A1* | 1/2004 | Beauerle ............. F02D 41/0007 701/102 |
| 2004/0216519 A1* | 11/2004 | Baeuerle ................ F02B 39/16 73/114.38 |
| 2005/0235743 A1 | 10/2005 | Stempnik et al. |
| 2007/0028615 A1* | 2/2007 | Weber ....................... F01N 3/22 60/602 |
| 2007/0073467 A1 | 3/2007 | Hill .............................. 701/105 |
| 2007/0119172 A1 | 5/2007 | Barbe et al. |
| 2007/0130945 A1 | 6/2007 | Rollinger et al. .......... 701/105 |
| 2007/0144502 A1 | 6/2007 | Ogawa et al. |
| 2007/0163258 A1 | 7/2007 | Narita et al. ............... 701/1 |
| 2010/0043746 A1 | 2/2010 | Hartmann et al. ......... 123/299 |
| 2011/0029216 A1 | 2/2011 | Shibata et al. |
| 2012/0037132 A1 | 2/2012 | Heinkele et al. |
| 2012/0085314 A1 | 4/2012 | Cleeves ...................... 123/294 |
| 2012/0125298 A1 | 5/2012 | Lemke ........................ 123/51 B |
| 2012/0137678 A1 | 6/2012 | Brahma ...................... 60/605.1 |
| 2014/0373814 A1 | 12/2014 | Herold et al. |
| 2014/0373815 A1 | 12/2014 | Nagar et al. ........... F02B 75/28 |
| 2014/0373816 A1 | 12/2014 | Nagar ..................... F02D 41/00 |
| 2015/0219030 A1* | 8/2015 | Naik ....................... F02M 26/08 60/599 |
| 2015/0240826 A1 | 8/2015 | Leroy et al. ................ 60/605.1 |
| 2015/0285176 A1 | 10/2015 | Kubota ....................... 73/114.34 |
| 2016/0160781 A1 | 6/2016 | Nagar et al. |
| 2016/0341104 A1* | 11/2016 | Redon ................... F02B 75/282 |
| 2016/0369686 A1* | 12/2016 | Redon ................... F02B 75/282 |

FOREIGN PATENT DOCUMENTS

| | | |
|---|---|---|
| DE | 102008054514 A1 | 6/2010 |
| DE | 102014201947 B3 | 1/2015 |
| EP | 1357275 A1 | 10/2003 |
| EP | 2487356 A2 | 8/2012 |
| EP | 3105430 A1 | 12/2016 |
| FR | 2995354 A1 | 3/2014 |
| WO | WO-2011/146111 A1 | 11/2011 |
| WO | WO-2013/126347 A1 | 8/2013 |
| WO | WO-2014/069243 A1 | 5/2014 |
| WO | WO-2016/089662 A1 | 6/2016 |

OTHER PUBLICATIONS

Office Action dated Apr. 29, 2016 in U.S. Appl. No. 14/404,396.
Amendment dated Jul. 29, 2016 in U.S. Appl. No. 14/404,396.
Final Rejection dated Oct. 12, 2016 in U.S. Appl. No. 14/404,396.
*Thales Visionix* v. *United States*, No. 2015-5150 (Fed. Cir. Mar. 8, 2017).
Jan. 2018: Eligibility Quick Reference Sheet.
Notification of First Office Action dated Dec. 6, 2018, for Chinese Patent Application No. 2015800656085.
International Search Report and Written Opinion for PCT application PCT/US2018/014100, dated Jul. 26, 2018.
Communication under Rule 71(3) EPC dated May 13, 2019, issued by the European Patent Office, for European patent application No. 15816563.9.
Communication under Rule 161/162 EPC dated Aug. 13, 2019, issued by the European Patent Office, for European patent application No. 18715277.2.
International Preliminary Report on Patentability dated Aug. 15, 2019, issued by the International Bureau of WIPO, for PCT application No. PCT/US2018/014100.
Non-Final Office Action dated Apr. 2, 2019, for U.S. Appl. No. 15/990,409.

* cited by examiner

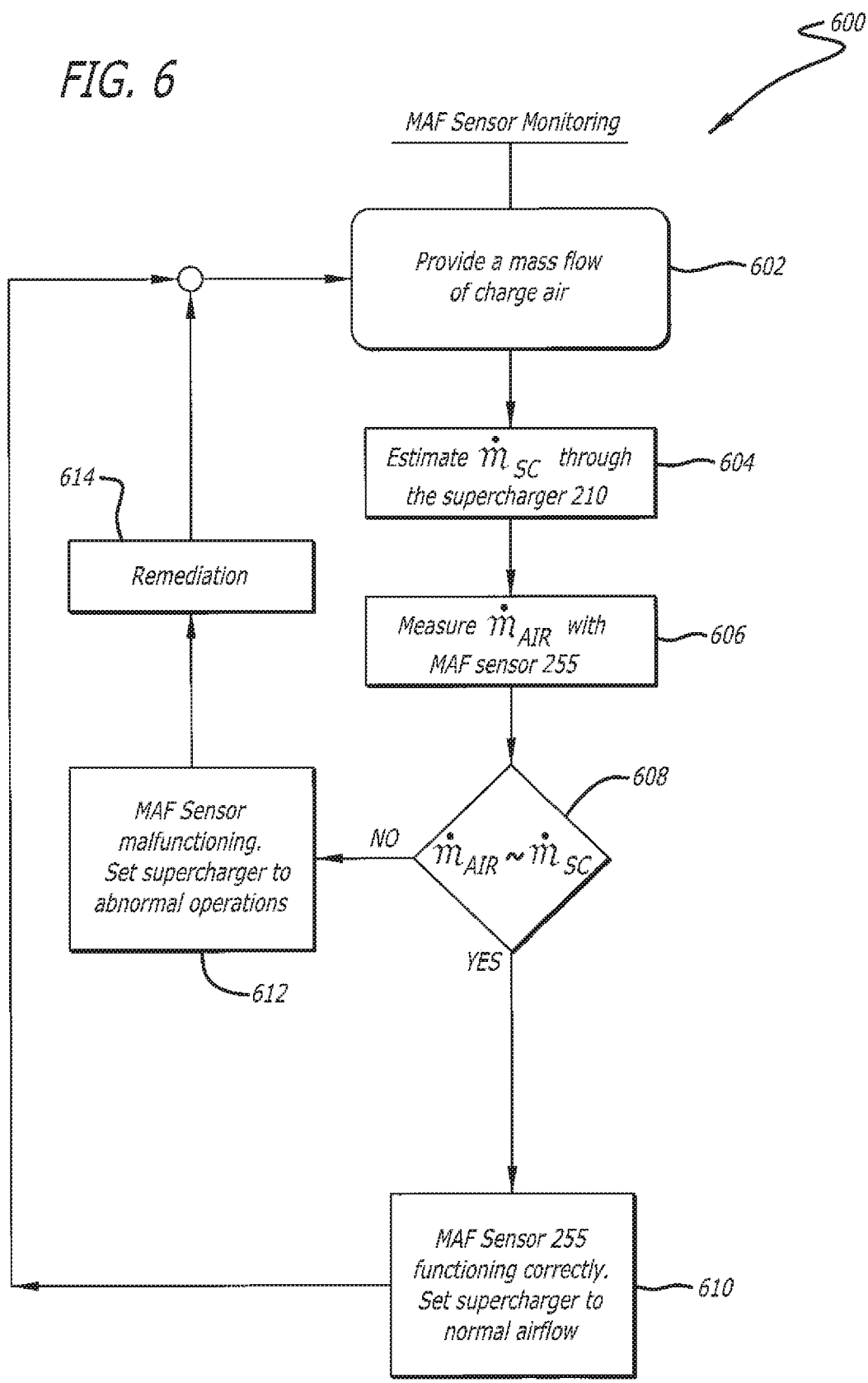

ional U.S. application Ser. No. 13/926,360, filed Jun. 25, 2013 for "Air Handling Control for Opposed-Piston Engines with Uniflow Scavenging," published as US 2014/0373814 A1, now U.S. Pat. No. 9,206,751 B2, and commonly-owned U.S. application Ser. No. 14/560,612, filed Dec. 4, 2014 for "On-Board Diagnostics For An Opposed-Piston Engine Equipped With A Supercharger," published as US 2016/0160781 A1.

FIELD

The field is internal combustion engines, particularly uniflow-scavenged, opposed-piston engines. More specifically, the field is related to monitoring of a mass airflow sensor in an opposed-piston engine equipped with a supercharger.

BACKGROUND

In a conventional four-stroke cycle, internal combustion engine, a single piston in a cylinder completes a cycle of operation during two complete revolutions of a crankshaft. During an intake stroke, movement of the piston from top to bottom dead center creates a low pressure environment that draws air into the cylinder in preparation for the following compression stroke. In this manner, the flow of gas through the engine is aided by the pumping action of the piston during the intake stroke.

In a two-stroke cycle, opposed-piston engine, two oppositely-disposed pistons in a cylinder complete a cycle of operation during a single revolution of a crankshaft. The cycle includes a compression stroke followed by a power stroke, but it lacks a distinct intake stroke during which the cylinder is charged with fresh air by movement of a piston. Instead near the end of the power stroke, pressurized fresh air enters the cylinder through an intake port near one end of the cylinder and flows toward an exhaust port near an opposite end of the cylinder as exhaust exits. Thus, gas (charge air, exhaust, and mixtures thereof) flows through the cylinder and the engine in one direction, from intake port to exhaust port. The unidirectional movement of exhaust gas exiting through the exhaust port, followed by pressurized air entering through the intake port, is called "uniflow scavenging". The scavenging process requires a continuous positive pressure differential from the intake ports to the exhaust ports of the engine in order to maintain the desired unidirectional flow of gas through the cylinders. Without this continuous positive pressure differential, combustion can falter and fail. At the same time, a high air mass density must be provided to the intake ports because of the short time that they are open. All of this requires pumping work in the engine, which is unassisted by a dedicated piston pumping stroke as in a four-stroke cycle engine.

The pumping work required to maintain the unidirectional flow of gas in an opposed-piston engine is done by an air handling system (also called a "gas exchange" system) which moves fresh air into and transports combustion gases (exhaust) out of the engine's cylinders. The air handling elements that do the pumping work may include one or more gas-turbine driven compressors (e.g., a turbocharger) and/or a mechanically-driven pump, such as a supercharger (also called a "blower"). In one example, a compressor is disposed in tandem with a supercharger in a two-stage pumping configuration. The pumping arrangement (single stage, multi-stage, or otherwise) drives the scavenging process, which is critical to ensuring effective combustion, increasing the engine's indicated thermal efficiency, and extending the lives of engine components such as pistons, rings, and cylinders. Manifestly, in a two-stroke cycle, opposed-piston engine, airflow is one of the most fundamental factors by which engine operation is controlled.

For effective control of airflow, information regarding the mass of incoming air ("mass airflow") is vital to measurement of airflow conditions and to determination of precise and accurate control parameter values with which the air handling devices are actuated. Parametrically, mass airflow is often expressed in SI units, for example kg/s (kilograms per second). In many instances, measurement of air mass entering the air handling system of an opposed-piston engine is enabled by a mass airflow sensor positioned in a charge air channel of the air handling system. The dynamics of airflow pressure and temperature in the charge air channel subject such devices to extreme stress. Consequently, it is important to monitor the operation of a mass airflow sensor in an opposed-piston engine in order to ensure the integrity and accuracy of the mass airflow measurement which underpins the airflow-based control of the engine.

The above-referenced '612 application describes an on-board diagnostic system of an opposed-piston engine that monitors air handling system elements for proper functionality. Initial steps taken in preparation for on-board diagnosis of air handling elements include determining operational validity of air handling sensors, including a mass airflow sensor. A mass airflow sensor failure will stop an air handling diagnostic process since any further diagnostics would be invalid. Accordingly, it is desirable to enable the system to assess measurement functionality of the sensor.

SUMMARY

Operation of a mass airflow (MAF) sensor in an air handling system of a uniflow-scavenged, opposed-piston engine is monitored by comparison with an airflow characteristic, for example a mass airflow rate through a supercharger of the air handling system.

Accuracy of a MAF sensor in air handling system of a uniflow-scavenged, opposed-piston engine is assessed by comparison of a mass airflow rate measured by the MAF sensor with a mass airflow rate through a two-stage pumping configuration of the engine.

In some instances, a mass airflow rate through the supercharger is obtained by means of a lookup table accessed by a measured pressure ratio across the supercharger and a shaft speed of the supercharger.

In other instances, a mass airflow rate through the supercharger is obtained by means of estimation, calculation, and/or program declaration.

BRIEF DESCRIPTION OF THE DRAWINGS

FIG. 6 is a flow diagram showing a monitoring algorithm implemented by operation of a control mechanization embodiment according to FIG. 3.

DETAILED DESCRIPTION OF THE PREFERRED EMBODIMENTS

Figure 1:
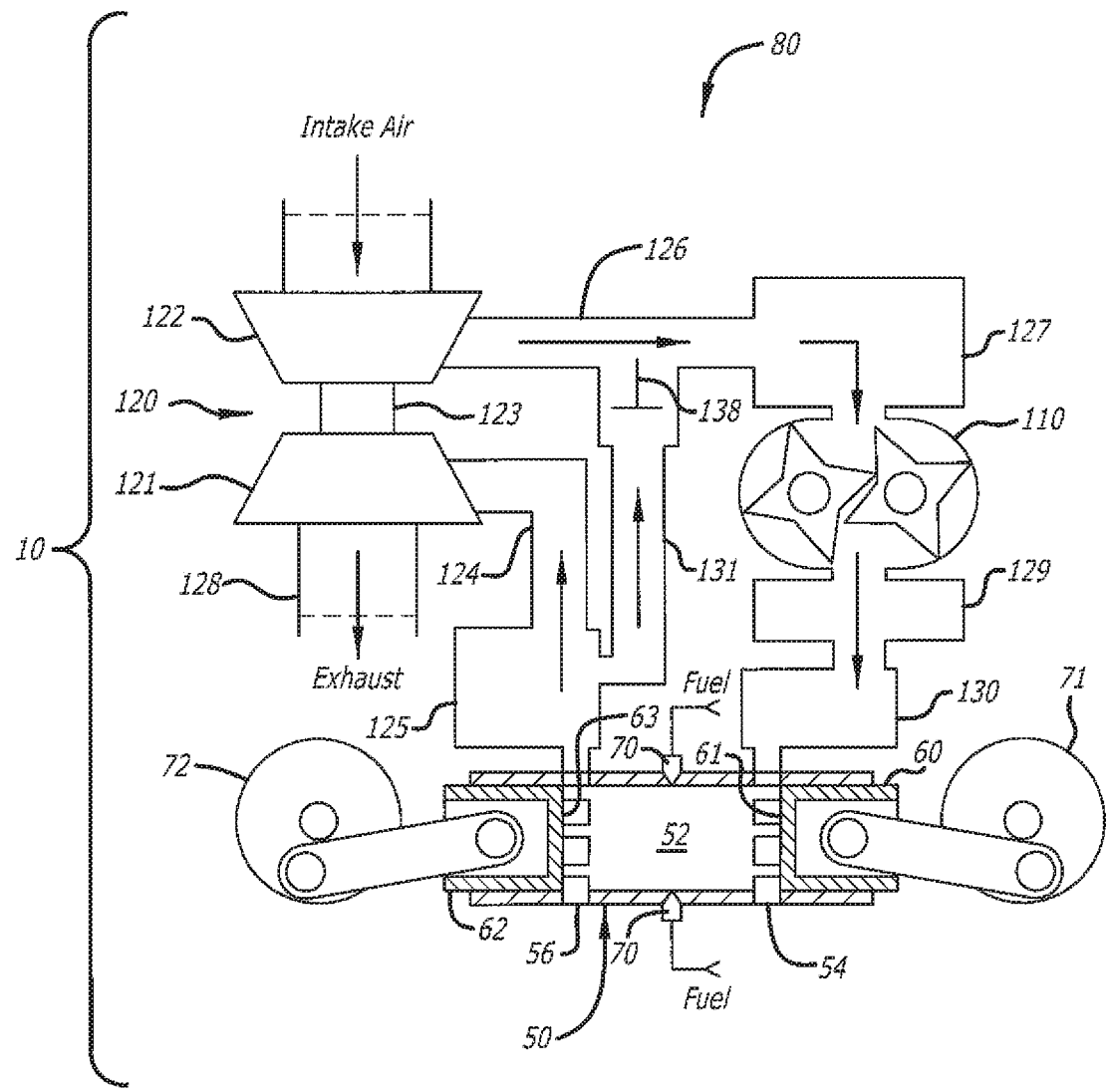
FIG. 1 is a diagram showing an opposed-piston engine equipped with an air handling system, and is properly labeled "Prior Art".

Opposed Piston Engine Example:

FIG. 1 shows, in schematic form, an opposed-piston engine 10 having at least one ported cylinder 50. For example, the engine may have one ported cylinder, two ported cylinders, three ported cylinders, or four or more ported cylinders. Each ported cylinder 50 has a bore 52 and longitudinally spaced intake and exhaust ports 54 and 56 formed or machined near respective ends of a cylinder wall. Each of the intake and exhaust ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slidably disposed in the bore 52 of each cylinder with their end surfaces 61 and 63 opposing one another. Movement of the piston 60 controls the operation of the intake port 54. Movement of the piston 62 controls the operation of the exhaust port 56. Thus, the ports 54 and 56 are referred to as "piston controlled ports". Pistons 60 controlling intake ports ("intake pistons") are coupled to a crankshaft 71. Pistons 62 controlling exhaust ports of the engine ("exhaust ports") are coupled to a crankshaft 72.

Each piston moves between a bottom center (BC) location where it is nearest one end of the cylinder and a top center (TC) location where it is furthest from the one end. As pistons 60 and 62 move away from their respective BC locations they close their respective ports; as they continue toward their TC locations, air admitted through the now-closed intake port is compressed between their end surfaces 61 and 63. As the pistons approach their TC locations, a combustion chamber is defined in the bore 52 between their end surfaces. Fuel is injected directly into the combustion chamber through at least one fuel injector nozzle 70 positioned in an opening through the sidewall of a cylinder 50. The fuel mixes with the increasingly compressed charge air. As the mixture is further compressed between the end surfaces it reaches a temperature that causes the fuel to ignite; in some instances, ignition may be assisted, as by spark or glow plugs. When ignition occurs, combustion follows. The pressure of combustion forces the pistons apart and causes them to move to their respective BC locations. As the pistons move through their BC locations, exhaust is transported out of the cylinder and charge air is admitted into the cylinder in the uniflow-scavenging process.

The engine 10 includes an air handling system 80 that manages the transport of charge air provided to, and exhaust gas produced by, the engine 10. A representative air handling system construction includes a charge air subsystem and an exhaust subsystem. The charge air subsystem receives and compresses fresh air and includes a charge air channel that transports the compressed air to the intake port or ports of the engine. One or more stages of air processing may be provided. For example, the charge air subsystem may comprise one or both of a turbine-driven compressor and a supercharger. The charge air channel typically includes at least one air cooler that is coupled to receive and cool the charge air (or a mixture of gasses including charge air) before delivery to the intake port or ports of the engine. The exhaust subsystem includes an exhaust channel that transports exhaust products from exhaust ports of the engine for delivery to other exhaust components.

A typical air handling system for an opposed-piston engine is shown in FIG. 1. The air handling system 80 may comprise a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 56 and flows into an exhaust channel 124 directly from the exhaust port or ports 56, or from an exhaust manifold 125 (which may comprise an exhaust plenum or chest in a cylinder block) that collects exhaust gasses output through the exhaust port or ports 56. In this regard, the turbine 121 is rotated by exhaust gas passing through it. This rotates the compressor 122, causing it to generate charge air by compressing fresh air. Charge air output by the compressor 122 flows through a charge air channel 126 to a cooler 127 whence it is pumped by a supercharger 110 to the intake ports. Charge air compressed by the supercharger 110 can be output through a cooler 129 to an intake manifold 130 (which may comprise an intake plenum or chest in a cylinder block) for provision to the intake port or ports 54. In some instances, exhaust products may be recirculated into the charge air channel through an exhaust gas recirculation (EGR) channel 131 for the purpose of reducing unwanted emissions.

Figure 2:
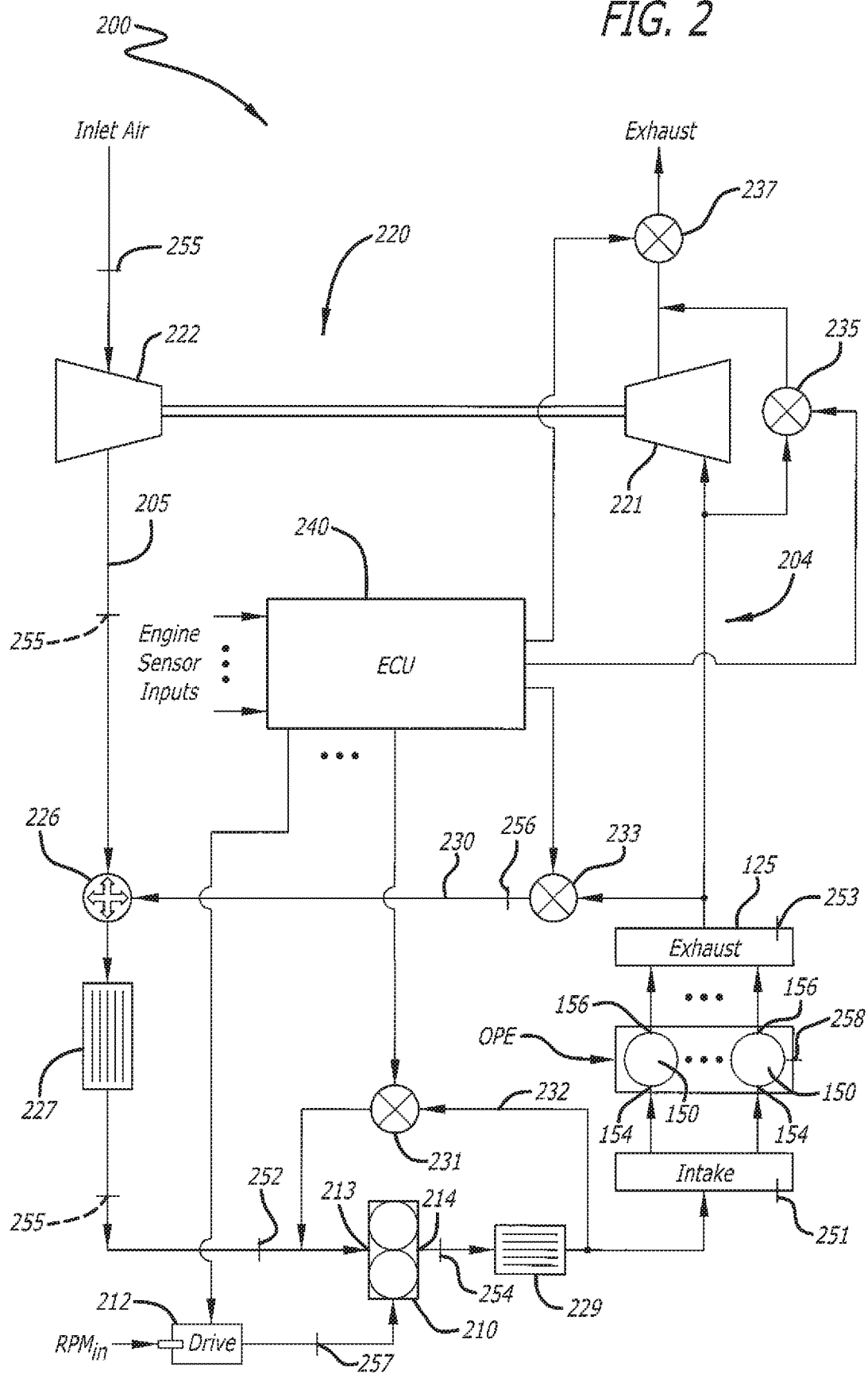
FIG. 2 is a schematic drawing showing an air handling system of a uniflow-scavenged, opposed-piston engine equipped for monitoring the operation of a mass airflow (MAF) sensor.

Opposed-Piston Engine Air Handling System:

An air handling system 200 for a uniflow-scavenged, opposed-piston engine is shown in schematic form in FIG. 2. The opposed-piston engine (OPE) includes a plurality of ported cylinders 150, each including intake and exhaust ports 154 and 156. The air handling system 200 includes an exhaust channel 204 and a charge air channel 205. A supercharger 210 in the charge air channel 205 receives input rotary power from a drive unit 212. Although the figure shows the drive unit 212 separately from the supercharger 210, this is not meant to exclude the option of integrating these elements into a single unit. The supercharger 210 includes an inlet 213 and an outlet 214. The outlet 214 of the supercharger is coupled to an intake port 154 of the engine by way of an intake manifold, chest, or plenum (INTAKE).

Preferably, the air handling system 200 also includes a turbocharger 220 with a turbine 221 and a compressor 222. The turbine 221 is coupled to the exhaust channel 204 and the compressor 222 is coupled to the charge air channel 205, upstream of the supercharger 210. The tandem arrangement of the compressor 222 with the supercharger 210 constitutes a two-stage pumping configuration in which the supercharger 210 accelerates the air in the charge air channel that has been compressed by the compressor 222 and provides accelerated compressed charge air (sometimes called "boost") to the intake ports 154. Optionally, the air handling system may include an EGR channel 230 to transport exhaust products from the exhaust channel 204 to the charge air channel 205 via an EGR mixer 226.

Figure 3:
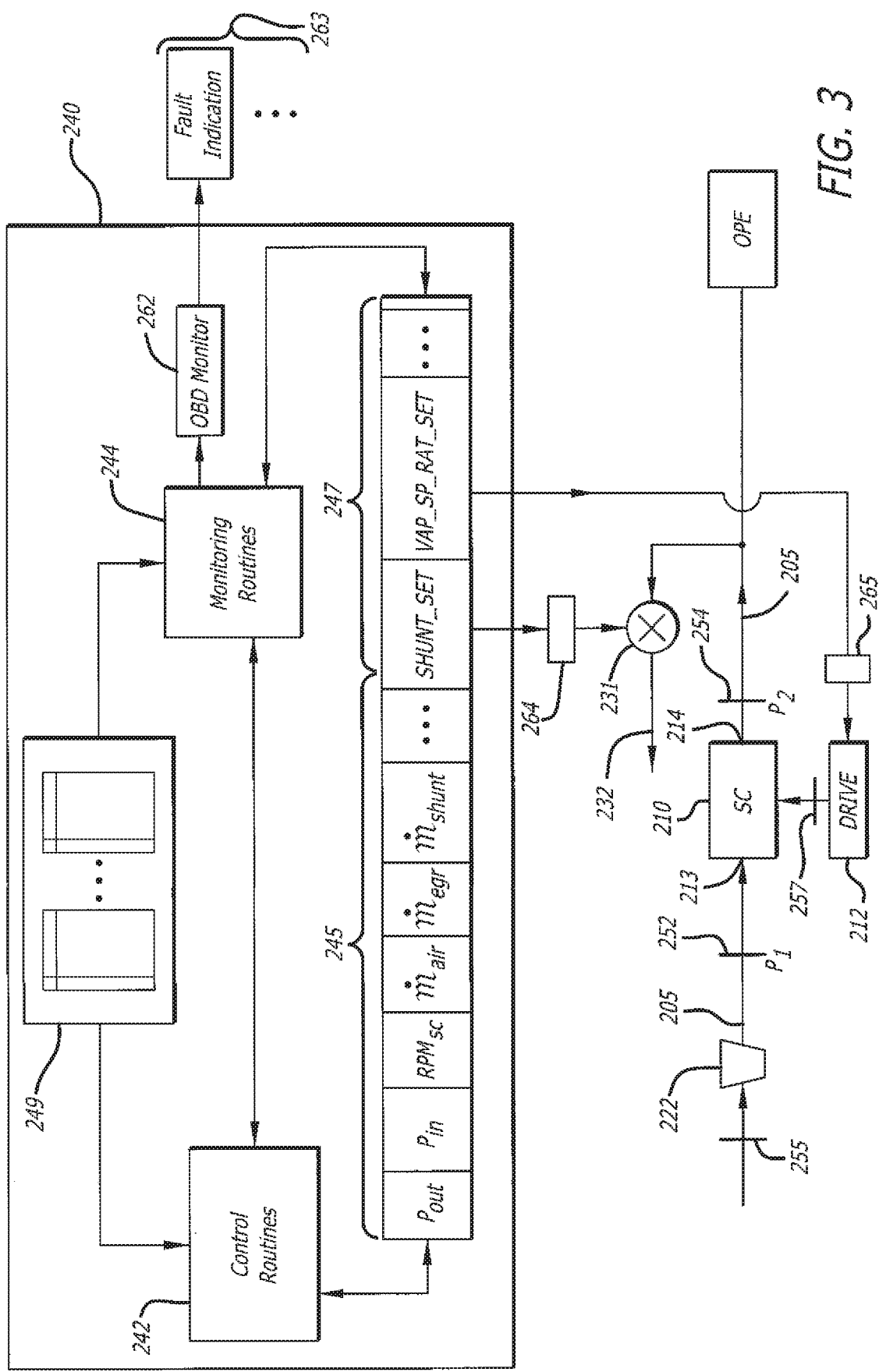
FIG. 3 is a schematic illustration showing a control system that can be used with the air handling system of FIG. 2 with an illustrative control mechanization equipped to monitor the operation of the MAF sensor of FIG. 2.

As shown in FIG. 3, the OPE engine is equipped with an engine control mechanization which is a computer-based system including one or more electronic control units coupled to associated sensors, actuators, and other machinery throughout the engine that governs the operations of various engine systems, including the air handling system, a fuel system, a cooling system, and other engine systems. The engine control elements that govern the air handling system are referred to collectively as the "air handling control mechanization."

Control of the gas transport configuration of the air handling system shown in FIGS. 2 and 3 is implemented by an air handling control mechanization that includes an ECU (engine control unit) 240 programmed to execute air handling processing algorithms including monitoring algorithms under various operating conditions, air handling valves and associated actuators, the supercharger 210, and engine sensors. Air handling system control is exercised by actuation of variable valves. In this regard, for example, a supercharger shunt valve 231 (also called a "recirculation valve" or a"bypass valve") transports charge air output by the supercharger 210 through a shunt channel 232 so as to modulate charge air pressure and dampen surges at the intake ports 154. An EGR valve 233 adjusts the amount of exhaust gas that is transported through the EGR branch 230 to the charge air channel 205 for control of emissions. For fast, precise automatic operation, it is preferred that these and other valves in the air handling system be high-speed, computer-controlled devices, with continuously-variable settings. The ECU 240 is in control communication with actuators (not seen in FIG. 2) that operate the valves in response to ECU-issued control signals.

The ECU 240 monitors air handling system operating conditions by way of various air handling sensors. In this regard, for example, supercharger intake and outlet charge air pressures are measured with gas pressure sensors 252 and 254, respectively. Engine intake air and exhaust pressures are measured by gas pressure sensors 251 and 253, respectively. Exhaust mass flow in an EGR channel is measured by sensor 256. Supercharger shaft speed is measured by a shaft speed sensor 257. Engine speed is measured by a crankshaft speed sensor 258. For purposes of this specification these and other sensors may comprise physical measurement instruments and/or virtual systems. The sensor positions shown in the figures are indicative of locations where in the air handling system the measured parameter value could be obtained if measured by a physical instrument.

In most cases, to obtain the rotary power necessary to its operation, the supercharger 210 is directly coupled to the engine-usually via a crankshaft-driven drive apparatus. In these cases the speed of the supercharger is dependent on the speed of the engine. In some instances, it is desirable to be able to vary the supercharger's speed independently of engine speed so as to gain greater flexibility and precision in charge air control, which can improve the air handling operations and contribute to the achievement of optimal engine performance. For example, at low engine speeds when quick acceleration is required, faster rotation of the supercharger delivers higher boost levels than would be available with conventional coupling to an engine crankshaft. Thus, it may be the case that the drive 212 is equipped with a transmission that enables the supercharger to be driven, under command of the air handling control mechanization, at a continuously-, or incrementally-, variable speed, independently of a crankshaft. Alternatively, the drive 212 may be an electrical device. Although the drive 212 is illustrated as being a separate device, it may be integrated with the supercharger to form a single unit therewith. In some of these instances the supercharger shunt valve 231 may be redundant. That is to say, the greater the variability in supercharger speed afforded by the variable-speed drive, the less likely a bypass valve would be needed to modulate boost pressure.

However, there may be instances wherein a drive unit is constructed to provide a limited number of speeds (two speeds, for example) and flexibility in control of boost pressure may require the operations of a supercharger shunt valve. Such instances are addressed in this disclosure.

With reference to FIG. 3, the ECU 240 is constructed to execute an air handling control process to configure the gas transport configuration of the air handling system as required by a current engine operating state, in response to engine conditions measured by various engine sensors. The air handling control process includes one or more air handling control routines 242 to be continuously executed during engine operation, and one or more monitoring routines 244 to be recurrently executed as the engine operates.

The ECU 240 is constructed with a microprocessor, associated program storage, memory, and data storage. Code that enables the ECU to execute various control, monitoring, and diagnostics processes resides in the program storage. Interface electronics associated with or built into the ECU format input data signals and generate output control and information signals and connect the ECU with sensors, actuators, displays, indicators, and other peripheral devices.

As the engine operates, the ECU 240 executes various engine system control processes, including processes for control of air handling and fuel injection systems. Such processes may include open- and/or closed-loop air handling processes. These processes use values of control parameters associated with operation of an opposed-piston engine air handling system, and execute various procedures to control air handling elements based on the control parameter values. The ECU 240 may obtain control parameter values by any one or more of a number of instrumentalities including sensor measurement, table look-up, calculation, estimation, and program declaration. The description of any particular instrumentality of data obtainment in this specification is for illustration only and is not intended to exclude, disclaim, or surrender any alternative. The ECU 240 includes registers 245 that receive data signal inputs from sensors, and registers 247 that store commands which are converted to actuation (control) signals with which actuators operate air handling devices. In response to a command, an actuator puts an associated device into action. For example, after receiving a command, a valve actuator converts a command to actuation signals that move its associated valve to the state required by the command. For examples of opposed-piston air handling control mechanizations of this type, see the related commonly-owned U.S. application Ser. Nos. 13/926,360 and 14/560,612 disclosed hereinabove.

MAF Sensor Monitoring:

According to one aspect of this disclosure, an opposed-piston engine with a compressor disposed in tandem with a supercharger in a two-stage pumping configuration includes an air handling control mechanization with a monitoring system for determining whether or not the MAF sensor is correctly measuring airflow. In another instance, an opposed-piston engine air handling system comprises a charge air channel including a supercharger coupled to an intake port of the engine. Measured and estimated mass airflow measurements are compared and an actuator changes the mass airflow through the supercharger based on the comparison. According to yet another aspect of this disclosure, a monitoring method is used to check the quality of airflow measurements made by the MAF sensor by comparing the MAF sensor output with supercharger characteristics, for example mass airflow through the supercharger.

Preferably, but not necessarily, MAF sensor monitoring according to this specification is integrated into, and is thus an element of an on-board diagnostic (OBD) system with which diagnostic results and/or faults are detected and reported by diagnostic control processes by way of an OBD monitor 262 which causes one or more OBD fault indications 263 to be output. Such fault indications may include one or more of indicator lights and icons, diagnostic codes, and information readouts.

FIGS. 2 and 3 show an opposed-piston engine with a compressor disposed in tandem with a supercharger in a two-stage pumping configuration which comprises an air handling control mechanization with a monitoring system for determining whether or not the MAF sensor is correctly measuring airflow. The monitoring system includes the ECU 240, gas pressure sensors 252 and 254, the MAF sensor 255, the supercharger speed sensor 257, and one or more monitoring routine algorithms 244 and associated data tables 249 on the ECU 240. The sensor 252 measures the pressure ($P_1$) of charge air in the charge air channel upstream of the supercharger near the supercharger inlet 213. The sensor 254 measures the pressure ($P_2$) in the charge air channel downstream of the supercharger near the supercharger outlet 214. The supercharger speed sensor 257 measures the shaft speed ($RPM_{SC}$) of the supercharger. For alternate or additional monitoring procedures, the air handling control mechanization may further include gas pressure sensors 251 and 253 and the engine speed sensor 258. The sensor 251 measures the pressure ($P_{im}$) of charge air in the INTAKE manifold, plenum, or chest of the engine. The sensor 253 measures the pressure ($P_{exh}$) of exhaust in the EXHAUST manifold, plenum, or chest of the engine. The engine speed sensor 258 measures the speed ($RPM_C$) of an engine crankshaft.

FIG. 2 shows alternate locations in the charge air subsystem where the MAF sensor 255 may be located to measure mass airflow. In many instances, the MAF sensor 255 is positioned upstream of the compressor inlet, where it measures the fresh air that is taken into the charge air subsystem of the engine. Of course, in this location it will not measure the total amount of charge air entering the engine if the engine includes an EGR channel with an outlet in the charge air channel that is downstream of the MAF sensor 255. An alternate location is in the charge air channel between the compressor outlet and the supercharger inlet. If the engine is equipped with EGR, this location may be above or below the EGR outlet. In all of these cases, the MAF sensor is located upstream of the supercharger inlet 213. It should be noted that introduction of EGR or supercharger into the charge air channel is optional and the respective outlets for these elements can be placed in any order in the charge air channel between the compressor outlet and the supercharger inlet.

Figure 4:
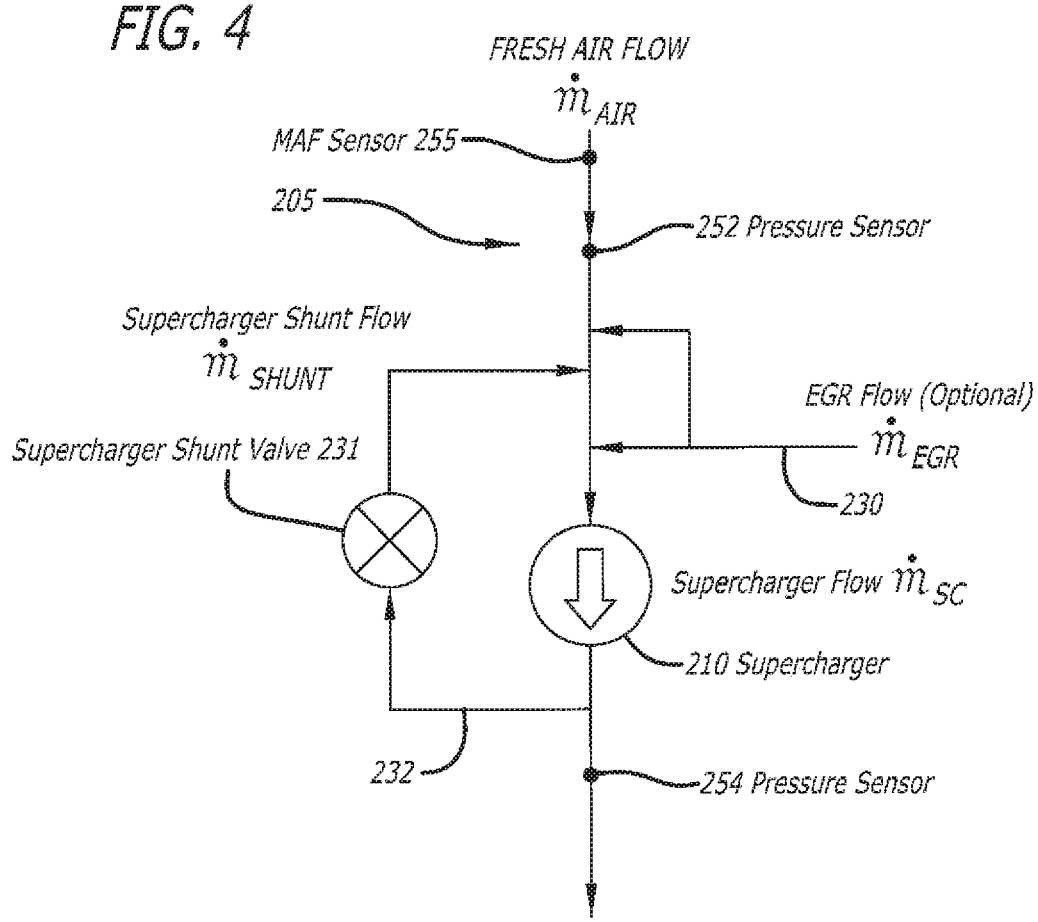
FIG. 4 is a schematic illustration showing a preferred MAF monitoring arrangement.

In a preferred monitoring model shown in FIG. 4, the MAF sensor 255 is positioned in the charge air channel 205, upstream of: the supercharger 210, the outlet of the supercharger shunt channel 232, and the outlet of the EGR channel 230. In general, mass gas flow through the elements shown is represented according to the following Table:

| | |
|---|---|
| mass charge air flow through the supercharger 210 | $\dot{m}_{SC}$ |
| mass airflow measured by the MAF sensor 255 | $\dot{m}_{AIR}$ |
| mass charge air flow through the shunt channel 232 | $\dot{m}_{SHUNT}$ |
| mass exhaust flow through the EGR channel 230 | $\dot{m}_{EGR}$ |

With knowledge of the of mass charge air flow through the supercharger 210, the mass airflow measurement produced by the MAF sensor 255 can be continuously monitored by comparison of two airflow values. In one case, without EGR exhaust flow and shunt airflow into the charge air channel, the measured mass airflow should equal the flow of charge air across the supercharger 210; that is to say, $\dot{m}_{AIR} \sim \dot{m}_{sc}$. In this case a malfunction of the MAF sensor 255 is indicated if comparison of the two values indicates a deviation greater than a calibratable threshold. In a second case, If there is EGR or supercharger shunt flow, then, $\dot{m}_{AIR} \sim (\dot{m}_{sc} - \dot{m}_{EGR} \dot{m}_{SHUNT})$ and a malfunction is established if comparison of the two values indicates a deviation greater than a calibratable threshold. Alternately, in each case, the measured mass airflow may be compared to a range of predicted upper and lower bounds. In all cases, $\dot{m}_{sc}$, the charge air flow value through the supercharger 210, provides a basis with which to monitor and evaluate the mass airflow measurement made by the MAF sensor 255.

Figure 5:
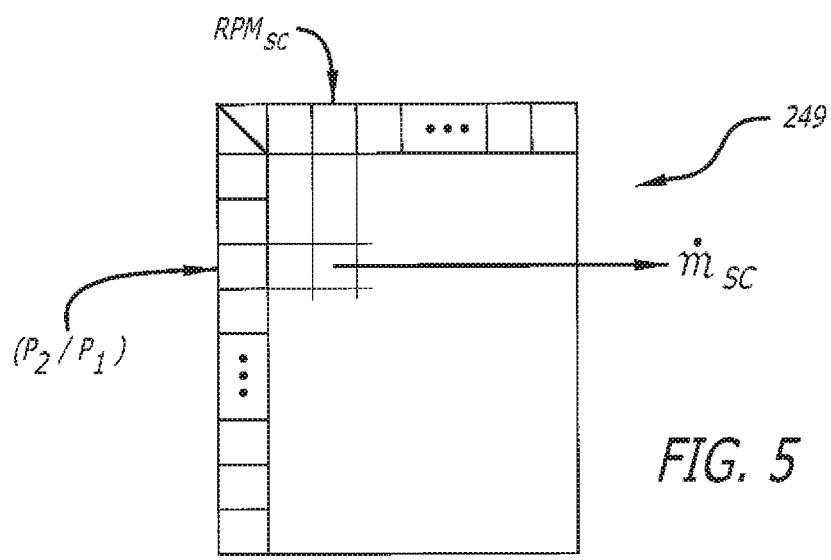
FIG. 5 is a schematic illustration showing a table that can be used in monitoring the MAF sensor of FIG. 2.

Mass charge air flow through the supercharger 210 may be determined by table lookup, calculation, estimation, and/or program declaration performed by the ECU 240. In a first instance, mass flow through the supercharger can be derived from a map based on a pressure ratio across the supercharger 210 and supercharger shaft speed. Using such a map, it is possible to determine real-time charge air flow through the supercharger ($\dot{m}_{sc}$) for a measured supercharger pressure ratio and supercharger shaft speed. This relationship can be mapped for the supercharger 210 and stored in the ECU 240 as a two-dimensional lookup table having a form shown in FIG. 5, which is indexed by values of first and second parameters. For the MAF sensor monitoring process, values of mass charge air flow ($\dot{m}_{sc}$) through the supercharger in the lookup table are indexed by the pressure ratio across the supercharger ($P_2/P_1$) and supercharger speed ($RPM_{sc}$). An exemplary method for making such determinations is disclosed in the related '612 application.

In other instances, mass charge air flow through the supercharger 210 can be derived from a map based on a pressure ratio across the engine and crankshaft speed. Using this map, it is possible to determine real-time charge air flow through the supercharger ($\dot{m}_{sc}$) for a measured engine pressure ratio and engine crankshaft speed. This relationship can be mapped for the supercharger 210 and stored in the ECU 240 as a two-dimensional lookup table having a form illustrated in FIG. 5, which is indexed by values of first and second parameters. For the MAF sensor monitoring process, values of mass charge air flow through the supercharger in the lookup table are indexed by the pressure ratio across the engine ($P_{exh}/P_{im}$), in which $P_{exh}$ is a pressure in the EXHAUST manifold, plenum, or chest of the engine and $P_{im}$ is a pressure in the INTAKE manifold of the engine, and engine speed ($RPM_C$). An exemplary method for making such determinations is disclosed in the related '751 patent.

In other instances, where EGR flow is zero or absent and mass flow through the supercharger is approximately equal to mass airflow through the engine, mass charge air flow through the supercharger 210 can be derived from a calculation, estimation, or inference of mass airflow through the engine based upon a stoichiometric air/fuel ratio $(A/F)_S$ as taught in equation (3) of the related '751 patent. Using this equation, it is possible to determine real-time charge air flow through the supercharger ($\dot{m}_{sc}$) for a known air/fuel relationship and a commanded engine fuel injection rate.

FIG. 6 shows a method 600 for monitoring a mass airflow sensor of an opposed-piston engine according to FIGS. 1 and 2, as would be performed by an air handling mechanization such as is shown in FIGS. 2 and 3. In step 602 a mass flow of pressurized air is provided through the charge air channel 205, via the supercharger 210, to an intake port 154 of a cylinder 150 of the opposed-piston engine. In step 604, the ECU 240 estimates a first mass airflow ($\dot{m}_{sc}$) through the supercharger 210 by use of any one of the look up or calculation techniques described hereinabove, or any equivalent thereof. If necessary, the ECU 240 adjusts the estimated value to account for EGR and/or supercharger shunt flow. In step 606, the ECU 240 measures a second mass airflow ($\dot{m}_{AIR}$) into the supercharger with the MAF sensor 255 located upstream of the supercharger. In step 608, the ECU 240 compares the first mass airflow with the second mass airflow. Based on the comparison, the ECU 240 actuates a device for changing the mass charge air flow through the supercharger 210. For example, the device may comprise either or both of the supercharger shunt valve 231 or the supercharger drive 212.

The comparison operation of step 608 may simply measure an arithmetic difference between the two airflow values. If the comparison indicates that the difference between the first and second airflows is zero, or within a predicted difference range, the ECU 240 in step 610 determines that the MAF sensor 210 is functioning correctly and sets the supercharger 210 to a commanded normal operational charge air flow level. A normal operational level may include an airflow level commanded for normal steady-state, transient state, or diagnostic operation. On the other hand, if the comparison indicates that the difference between the first and second airflows is non-zero, or outside of a predicted difference range, the ECU 240 in step 612 determines that the MAF sensor 210 is malfunctioning and sets the supercharger 210 to a commanded charge air flow level for degraded or abnormal operation. Additionally, the malfunction may cause a diagnostic control process being executed by the ECU 240 to generate one or more OBD fault indications. Such fault indications may comprise one or more of indicator lights and icons, diagnostic codes, and information readouts. The monitoring method remains in step 612 until appropriate remedial action is taken in step 614 to eliminate the cause of the malfunction, for example, by retesting or replacing the MAF sensor 255. Upon completion of remediation; malfunction indicators are reset and MAF sensor monitoring is reinitiated.

Actuation of the supercharger shunt valve 231 and/or the supercharger drive 212 during steps 610 and 612 of the monitoring process 600 may be understood with reference to FIG. 3. Preferably, the supercharger shunt valve 231 is operated by an electro-mechanical actuator 264 under control of the ECU 240. In this regard, the ECU 240 generates a shunt valve set command (SHUNT_SET) that is converted by interface electronics to a control signal communicated to the actuator 264. For example, the control signal may comprise a pulse-width modulated (PWM) signal that causes the actuator 264 to set the shunt valve 231 to a position in a range between a fully closed position where no charge air passes through the valve and fully open position. The variable-speed drive 212 may be driven by an electromechanical actuator 265 under control of the ECU 240. In this regard, the ECU command (VAR_SP_RAT_SET) is converted by interface electronics to a control signal—for example a pulse-width modulated (PWM) signal—that is coupled to the actuator 265. With this control configuration, a drive ratio (DR) of the variable speed drive 212 can be set, thereby enabling variable control of the speed of the supercharger. Alternately, the command, actuation, and operational sequence may be adapted for an electrically-operated supercharger drive.

Those skilled in the art will appreciate from the foregoing description that the broad teachings set forth herein can be implemented in many ways. Therefore, while MAF sensor monitoring in a supercharged opposed-piston engine has been described in connection with particular examples, the true scope of the principles underlying the description should not be so limited. Instead, other modifications may become apparent to the skilled practitioner upon consideration of the description and the following claims.

The invention claimed is:

1. An opposed-piston engine, comprising a compressor disposed in tandem with a supercharger in a two-stage pumping configuration coupled to a cylinder intake port of the opposed-piston engine, a mass airflow sensor disposed upstream of the supercharger in the pumping configuration, means for comparing an estimated mass airflow through the supercharger with a measured mass airflow obtained from the mass airflow sensor, and a source of an actuating signal, the actuating signal being such as to cause an air handling device to change the mass airflow through the supercharger in response to the comparison, wherein:
   if the comparison indicates that the mass airflow sensor is functioning correctly, the actuating signal causes the supercharger to be set to a normal operational charge air flow level; and,
   if the comparison indicates that the mass airflow sensor is malfunctioning, the actuating signal causes the supercharger to be set to a commanded charge air flow level for degraded or abnormal operation.

2. The opposed-piston engine of claim 1, in which the supercharger is in a charge air channel of the engine and the means for comparing comprises a programmable engine control device that is programmed to estimate a mass airflow through the supercharger by calculating a pressure ratio ($P_2/P_1$) in which $P_1$ is a pressure in the charge air channel upstream of the supercharger and $P_2$ is a pressure in the charge air channel downstream of the supercharger, measuring a shaft speed of the supercharger, and determining a mass airflow by accessing a look-up table using the pressure ratio and the shaft speed as inputs.

3. The opposed-piston engine of claim 1, in which the means for comparing comprises a programmable engine control device that is programmed to estimate a mass airflow through the supercharger by calculating a pressure ratio ($P_{exh}/P_{im}$), in which $P_{exh}$ is a pressure in an exhaust manifold of the opposed-piston engine and $P_{im}$ is a pressure in an intake manifold of the opposed-piston engine, measuring an engine speed, and determining a mass airflow by accessing a look-up table using the pressure ratio and the engine speed as inputs.

4. The opposed-piston engine of claim 1, in which the means for comparing comprises a programmed engine control device that is programmed to calculate a mass airflow into the opposed-piston engine.

5. The opposed-piston engine of any one of claims 1-4, wherein the air handling device includes one of a supercharger bypass valve and a supercharger drive.

6. The opposed-piston engine of claim 5, further comprising an exhaust gas recirculation (EGR) channel.

7. The opposed-piston engine of claim 5, further comprising a supercharger bypass channel which comprises the supercharger bypass valve.

8. The opposed-piston engine of claim 5, wherein the supercharger drive comprises one of an electrical drive and a mechanical drive coupled to a crankshaft of the opposed-piston engine.

9. The opposed-piston engine of claim 5, further comprising a turbine coupled to drive the compressor.

10. Opposed-piston engine air handling means comprising a charge air channel including a supercharger coupled to an intake port of an opposed-piston engine, means for obtaining an estimate of a first mass airflow through the supercharger, a mass airflow sensor upstream of the supercharger for obtaining a measurement of a second mass airflow into the supercharger, means for comparing the first mass airflow with the second mass airflow, and actuating means for changing the mass airflow through the supercharger based on the comparison, wherein:
- if the comparison performed by the means for comparing indicates that the mass airflow sensor is functioning correctly, the actuating means changes the mass airflow through the supercharger to a normal operational charge air flow level; and,
- if the comparison performed by the means for comparing indicates that the mass airflow sensor is malfunctioning, the actuating means changes the mass airflow through the supercharger to a commanded charge air flow level for degraded or abnormal operation.

11. The opposed-piston engine air handling means of claim 10, wherein the actuating means changes mass airflow through the supercharger by controlling one of a supercharger bypass valve and a supercharger drive.

12. The opposed-piston engine air handling means of claim 10, wherein the supercharger is in a charge air channel of the engine and the estimate of a first mass airflow comprises a mass airflow based on a pressure ratio ($P_2/P_1$), in which $P_1$ is a pressure in the charge air channel upstream of the supercharger and $P_2$ is a pressure in the charge air channel downstream of the supercharger, and a shaft speed of the supercharger.

13. The opposed-piston engine air handling means of claim 10, wherein the estimate of a first mass airflow is a mass airflow based on a pressure ratio ($P_{exh}/P_{im}$), in which $P_{exh}$ is a pressure in an exhaust manifold of the opposed-piston engine and $P_{im}$ is a pressure in an intake manifold of the opposed-piston engine, and an engine speed.

14. The opposed-piston engine air handling means of any one of claims 12-13, wherein the actuating means changes mass airflow through the supercharger by controlling one of a supercharger bypass valve and a supercharger drive.

15. A monitoring method for an opposed-piston engine, comprising:
- providing a mass flow of air to a supercharger coupled to an intake port of a cylinder of the opposed-piston engine;
- estimating a first mass airflow through the supercharger;
- measuring a second mass airflow into the supercharger with a mass airflow (MAF) sensor upstream of the supercharger;
- comparing the first mass airflow with the second mass airflow; and,
- based on the comparison, actuating a means for changing the mass airflow through the supercharger, wherein:
  - if the comparison indicates that the mass airflow sensor is functioning correctly, the actuation causes the supercharger to be set to a normal operational charge air flow level; and,
  - if the comparison indicates that the mass airflow sensor is malfunctioning, the actuation causes the supercharger to be set to a commanded charge air flow level for degraded or abnormal operation.

16. The monitoring method of claim 15, wherein actuating a means for changing the mass airflow through the supercharger includes actuating one of a supercharger bypass valve and a supercharger drive when said comparison indicates equivalence.

17. The monitoring method of claim 16, wherein equivalence occurs when the second mass airflow is within a range defined by an upper first mass airflow bound and a lower first mass airflow bound.

18. The monitoring method of claim 15, wherein the supercharger is in a charge air channel of the engine and estimating a mass airflow through the supercharger comprises determining a pressure ratio ($P_2/P_1$) in which $P_1$ is a pressure in the charge air channel upstream of the supercharger and $P_2$ is a pressure in the charge air channel downstream of the supercharger, determining a shaft speed of the supercharger, and determining a mass airflow based on the pressure ratio and the shaft speed.

19. The monitoring method of claim 15, wherein estimating a mass airflow through the supercharger comprises determining a pressure ratio ($P_{exh}/P_{im}$) in which $P_{exh}$ is a pressure in an exhaust manifold of the opposed-piston engine and $P_{im}$ is a pressure in an intake manifold of the opposed-piston engine, determining an engine speed, and determining a mass airflow based on the pressure ratio and the engine speed.

20. The monitoring method of claim 15, wherein estimating a mass airflow through the supercharger comprises determining a mass airflow into the opposed-piston engine.

21. The monitoring method of any one of claims 17-20, wherein actuating a means for changing the mass airflow through the supercharger includes actuating one of a supercharger bypass valve and a supercharger drive when said comparison indicates the second mass airflow is within a range defined by an upper first mass airflow bound and a lower first mass airflow bound.

22. The monitoring method of any one of claims 17-20, further including actuating a fault indicating means if the comparison indicates a malfunction of the MAF sensor.

* * * * *